(12) United States Patent
Ohlsson et al.

(10) Patent No.: US 9,910,527 B2
(45) Date of Patent: Mar. 6, 2018

(54) INTERPRETATION OF PRESSURE BASED GESTURE

(71) Applicant: FlatFrog Laboratories AB, Lund (SE)

(72) Inventors: Nicklas Ohlsson, Bunkeflostrand (SE); Andreas Olsson, Bjarred (SE); Mattias Krus, Lund (SE)

(73) Assignee: FlatFrog Laboratories AB, Lund (SE)

( * ) Notice: Subject to any disclaimer, the term of this patent is extended or adjusted under 35 U.S.C. 154(b) by 100 days.

(21) Appl. No.: 14/176,387

(22) Filed: Feb. 10, 2014

(65) Prior Publication Data

US 2014/0232669 A1 Aug. 21, 2014

Related U.S. Application Data

(60) Provisional application No. 61/765,154, filed on Feb. 15, 2013.

(51) Int. Cl.
*G06F 3/041* (2006.01)
*G06F 3/038* (2013.01)
*G06F 3/0488* (2013.01)

(52) U.S. Cl.
CPC .......... *G06F 3/0414* (2013.01); *G06F 3/038* (2013.01); *G06F 3/0416* (2013.01); *G06F 3/04883* (2013.01); *G06F 2203/04808* (2013.01)

(58) Field of Classification Search
CPC .... G06F 3/0414; G06F 3/038; G06F 3/04883; G06F 3/0416; G06F 2203/04808
See application file for complete search history.

(56) References Cited

U.S. PATENT DOCUMENTS 3,673,327 A 6/1972 Johnson et al.
4,254,333 A 3/1981 Bergstrom
(Continued)

FOREIGN PATENT DOCUMENTS

WO WO-2009/048365 A1 4/2009
WO WO-2010/006882 A2 1/2010
(Continued)

OTHER PUBLICATIONS

Swedish Search Report issued in Swedish Application No. 1350182-0, dated Dec. 11, 2013.

*Primary Examiner* — Temesghen Ghebretinsae
*Assistant Examiner* — Yaron Cohen
(74) *Attorney, Agent, or Firm* — Harness, Dickey & Pierce PLC (57) ABSTRACT

A method, gesture interpretation unit and touch sensing device receiving touch input data indicating touch inputs on a touch surface of the touch sensing device, wherein the touch input data comprises positioning data and pressure data for each touch input, and determining from the touch input data: first, second and third touch input from a first, a second and a third object on the touch surface, and wherein the first, second and third objects are present on the touch surface during overlapping time periods; and while continuous contact of the first, second and third objects with the touch surface is maintained: calculating a geometric center of mass, and a pressure center of mass, for the first, second and third touch inputs; comparing the GCM with the determining a movement vector based on the result of the comparison; and moving the graphical interactive object in relation to the movement vector.

21 Claims, 7 Drawing Sheets

(56) References Cited

U.S. PATENT DOCUMENTS

| | | | |
|---|---|---|---|
| 6,972,753 B1 | 12/2005 | Kimura et al. | |
| 2004/0252091 A1 | 12/2004 | Ma et al. | |
| 2005/0012714 A1* | 1/2005 | Russo | G06F 3/033 345/157 |
| 2006/0114237 A1 | 6/2006 | Crockett et al. | |
| 2007/0075648 A1 | 4/2007 | Blythe et al. | |
| 2008/0180404 A1 | 7/2008 | Han et al. | |
| 2009/0153519 A1 | 6/2009 | Suarez Rovere | |
| 2009/0256817 A1* | 10/2009 | Perlin | G06F 3/0233 345/174 |
| 2010/0229091 A1* | 9/2010 | Homma | G06F 3/04883 715/702 |
| 2010/0265170 A1* | 10/2010 | Norieda | G06F 3/011 345/156 |
| 2011/0285636 A1 | 11/2011 | Howard et al. | |
| 2012/0105358 A1 | 5/2012 | Momeyer et al. | |
| 2013/0285920 A1* | 10/2013 | Colley | G06F 3/0488 345/173 |
| 2014/0028575 A1* | 1/2014 | Parivar | G06F 3/0414 345/173 |
| 2015/0317036 A1 | 11/2015 | Andreas et al. | |

FOREIGN PATENT DOCUMENTS

| | | |
|---|---|---|
| WO | WO-2010/064983 A2 | 6/2010 |
| WO | WO-2010/134865 A1 | 11/2010 |
| WO | WO-2011/028169 A1 | 3/2011 |
| WO | WO-2011/049512 A1 | 4/2011 |

* cited by examiner

INTERPRETATION OF PRESSURE BASED GESTURE

This application claims priority under 35 U.S.C. § 119 to U.S. application No. 61/765,154 filed on Feb. 15, 2013, the entire contents of which are hereby incorporated by reference.

FIELD OF THE INVENTION

The present invention relates to interpretation of certain inputs on a touch sensing device, and in particular to interpretation of gestures comprising pressure or force.

BACKGROUND OF THE INVENTION

Touch sensing systems ("touch systems") are in widespread use in a variety of applications. Typically, the touch systems are actuated by a touch object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

To an increasing extent, touch systems are designed to be able to detect two or more touches simultaneously, this capability often being referred to as "multi-touch" in the art.

There are numerous known techniques for providing multi-touch sensitivity, e.g. by using cameras to capture light scattered off the point(s) of touch on a touch panel, or by incorporating resistive wire grids, capacitive sensors, strain gauges, etc into a touch panel.

WO2011/028169 and WO2011/049512 disclose multi-touch systems that are based on frustrated total internal reflection (FTIR). Light sheets are coupled into a panel to propagate inside the panel by total internal reflection (TIR). When an object comes into contact with a touch surface of the panel, the propagating light is attenuated at the point of touch. The transmitted light is measured at a plurality of outcoupling points by one or more light sensors. The signals from the light sensors are processed for input into an image reconstruction algorithm that generates a 2D representation of interaction across the touch surface. This enables repeated determination of current position/size/shape of touches in the 2D representation while one or more users interact with the touch surface. Examples of such touch systems are found in U.S. Pat. No. 3,673,327, U.S. Pat. No. 4,254,333, U.S. Pat. No. 6,972,753, US2004/0252091, US2006/0114237, US2007/0075648, WO2009/048365, US2009/0153519, WO2010/006882, WO2010/064983, and WO2010/134865.

The touch sensing technology gives the possibility to exchange hardware input devices with virtual equivalents. From US-2011/0285636-A1 it is known to have a virtual joystick, where a visual representation of a joystick is displayed on a touch screen. Touch data from the touch screen is processed to determine when the touch data indicates user interaction with the virtual joystick. Joystick data is generated based on the user interaction and the display of at least one other element on the touch screen can be adjusted based on the joystick data. Thus, a user may control movement of an element by positioning a finger in relation to the virtual representation of the joystick.

In touch systems in general, there is a desire to not only determine the location of the touching objects, but also to estimate the amount of force by which the touching object is applied to the touch surface. This estimated quantity is often referred to as "pressure", although it typically is a force. Examples of touch force estimation in connection to a FTIR based touch-sensing apparatus is disclosed in the Swedish application SE-1251014-5. An increased pressure is here detected by an increased contact, on a microscopic scale, between a touching object and a touch surface with increasing application force. This increased contact may lead to a better optical coupling between the transmissive panel and the touching object, causing an enhanced attenuation (frustration) of the propagating radiation at the location of the touching object.

The availability of force/pressure information opens up the possibility of creating an alternative virtual joystick for touch-based control of software applications, which takes advantage of the available force/pressure information.

The object of the invention is thus to provide a pressure based virtual joystick which enables control of a graphical interactive object presented on a GUI of a touch sensing device.

SUMMARY OF THE INVENTION

According to a first aspect, the object is at least partly achieved with a method according to the first independent claim. The method comprises presenting a graphical interactive object on a graphical user interface, GUI, of a touch sensing device, wherein the GUI is visible via a touch surface of the touch sensitive device. The method further comprises receiving touch input data indicating touch inputs on the touch surface of the touch sensing device, wherein the touch input data comprises positioning data $x_{nt}$, $y_{nt}$ and pressure data $p_{nt}$ for each touch input, and determining from the touch input data:

a first touch input from a first object at a first position on the touch surface, and a second touch input from a second object at a second position on the touch surface, and a third touch input from a third object at a third position on the touch surface, wherein the first, second and third objects are present on the touch surface during overlapping time periods; and while continuous contact of said first, second and third objects with the touch surface is maintained:

calculating a geometric centre of mass (GCM) for said first, second and third touch inputs using positioning data $x_{nt}$, $y_{nt}$ for the touch inputs;

calculating a pressure centre of mass (PCM) for the first, second and third touch inputs using pressure data $p_{nt}$ for the touch inputs;

comparing the GCM with the PCM;

determining a movement vector k based on the result of the comparison; and moving the graphical interactive object in relation to the movement vector k.

With the method a user is allowed to control a graphical interactive object in new advanced ways. The method gives rise to a function of a virtual joystick by means of a plurality of objects, e.g. a plurality of fingers of a user, and the user can by exerting pressure on the touch surface via her fingers control the graphical interactive object in an intuitive way. No separate hardware joystick is needed, and the appearance of a touch sensing device on which the method operates will be cleaner. Advanced games may be played on the touch sensing device. In a first stage there is no need to define a certain area on the touch surface where the user can interact with the GUI, whereby the method becomes more versatile than virtual joysticks found in prior art. Also, several users may control different graphical interactive objects at the same time on the same GUI.

According to one embodiment, the method comprises normalising the pressure data $p_{nt}$ for the first, second and third touch inputs. The pressure data will then not become incorrect due to unintentional different pressures of the touch inputs.

According to one embodiment, the method comprises determining a movement vector k with a direction and magnitude based on a difference between the GCM and the PCM. The moving step comprises according to one embodiment to compare the magnitude of the movement vector k with a threshold and moving the graphical interactive object when the magnitude exceeds the threshold. Thus, if the user unintentionally acts upon the touch surface with a small pressure or force, this action will not move the interactive graphical object.

According to one embodiment, the movement vector k is determined in a two-dimensional plane of the GUI. Two-dimensional plane may be defined as an x-y-plane of the interactive graphical object. According to another embodiment, the graphical interactive object is moved in relation to the movement vector k in a z-plane of the interactive graphical object. Thus, the interactive graphical object may be configured to be moved in different ways in relation to the movement vector k. The interactive graphical object may e.g. be moved in accordance with the movement vector.

According to a further embodiment, the method comprises determining from the touch input data a further touch input from a further object at a further position on the touch surface, wherein the steps of calculating a geometric centre of mass, GCM, and a pressure centre of mass, PCM, comprises using also touch input data from the further touch input. Thus, more than three objects may be used to control a graphical interactive object. The further object may e.g. be a further finger of a user.

When in the description it is referred to a pressure, it can equally mean a force.

According to a second aspect, the object is at least partly achieved with a gesture interpretation unit comprising a processor configured to receive touch input data indicating touch inputs on a touch surface of a touch sensing device, wherein the touch input data comprises positioning data $x_{nt}$, $y_{nt}$ and pressure data $p_{nt}$ for each touch input, the unit further comprises a computer readable storage medium storing instructions operable to cause the processor to perform operations comprising:

presenting a graphical interactive object via a graphical user interface, GUI, wherein the GUI is visible via the touch surface;

determining from said touch input data:
a first touch input from a first object at a first position on the touch surface, and
a second touch input from a second object at a second position on the touch surface, and
a third touch input from a third object at a third position on the touch surface, wherein the first, second and third objects are present on the touch surface during overlapping time periods; and while continuous contact of said first, second and third objects with the touch surface is maintained:

calculating a geometric centre of mass, GCM, for the first, second and third touch inputs using positioning data $x_{nt}$, $y_{nt}$ for the touch inputs;

calculating a pressure centre of mass, PCM, for the first, second and third touch inputs using pressure data $p_{nt}$ for the touch inputs;

comparing the GCM with the PCM;

determining a movement vector k based on the result of the comparison; and moving the graphical interactive object in relation to the movement vector k.

According to a third aspect, the object is at least partly achieved with a touch sensing device comprising:

a touch arrangement comprising a touch surface, wherein the touch arrangement is configured to detect touch inputs on the touch surface and to generate a signal $s_y$ indicating the touch inputs;

a touch control unit configured to receive the signal $s_y$ and to determine touch input data from said touch inputs and to generate a touch signal $s_x$ indicating the touch input data;

a gesture interpretation unit according to any of the embodiments as described herein, wherein the gesture interpretation unit is configured to receive the touch signal $s_x$.

According to one embodiment, the touch sensing device is an FTIR-based (Frustrated Total Internal Reflection) touch sensing device.

The positioning data may for example be a geometrical centre of a touch input. The pressure data is according to one embodiment the total pressure, or force, of the touch input. According to another embodiment, the pressure data is a relative pressure.

According to a fourth aspect, the object is at least partly achieved with a computer readable storage medium comprising computer programming instructions which, when executed on a processor, are configured to carry out the method as described herein.

Any of the above-identified embodiments of the method may be adapted and implemented as an embodiment of the second, third and/or fourth aspects. Thus, the gesture interpretation unit may include instructions to carry out any of the methods as described herein.

Preferred embodiments are set forth in the dependent claims and in the detailed description.

SHORT DESCRIPTION OF THE APPENDED DRAWINGS

Below the invention will be described in detail with reference to the appended figures, of which.

DETAILED DESCRIPTION OF PREFERRED EMBODIMENTS OF THE INVENTION

1. Device

Figure 1:
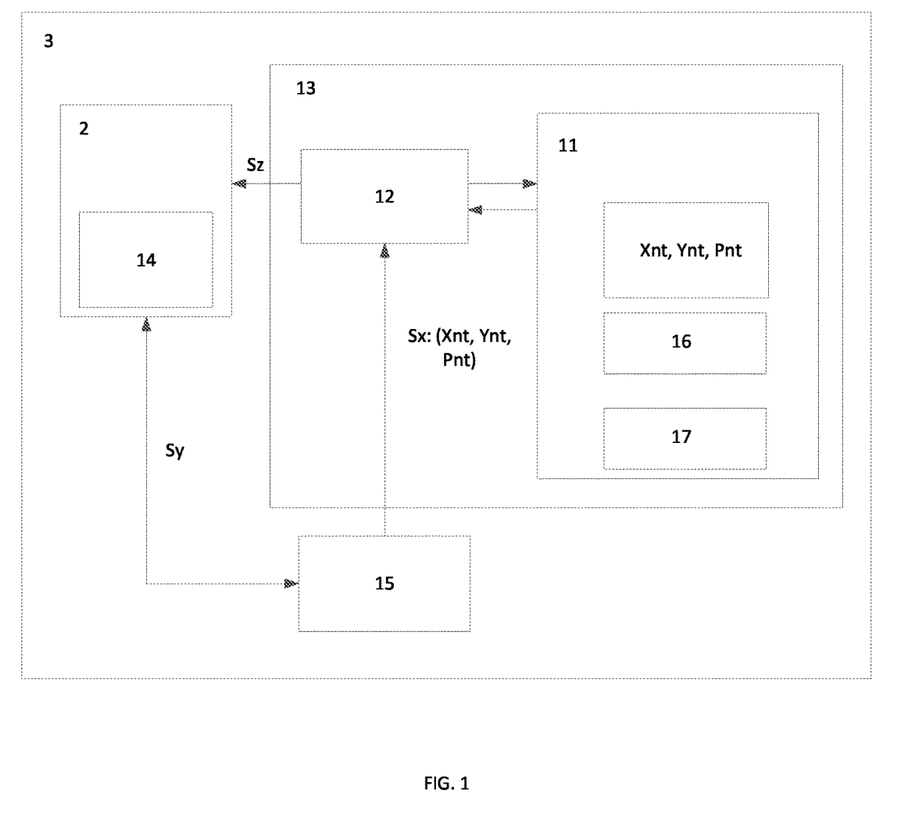
FIG. 1 illustrates a touch sensing device according to some embodiments of the invention.

FIG. 1 illustrates a touch sensing device 3 according to some embodiments of the invention. The device 3 includes a touch arrangement 2, a touch control unit 15, and a gesture interpretation unit 13. These components may communicate via one or more communication buses or signal lines. According to one embodiment, the gesture interpretation unit 13 is incorporated in the touch control unit 15, and they may then be configured to operate with the same processor and memory. The touch arrangement 2 includes a touch surface 14 that is sensitive to simultaneous touches. A user can touch on the touch surface 14 to interact with a graphical user interface (GUI) of the touch sensing device 3. The device 3 can be any electronic device, portable or non-portable, such as a computer, gaining console, tablet computer, a personal digital assistant (PDA) or the like. It should be appreciated that the device 3 is only an example and the device 3 may have more components such as RF circuitry, audio circuitry, speaker, microphone etc. and be e.g. a mobile phone or a media player.

Figure 5A:
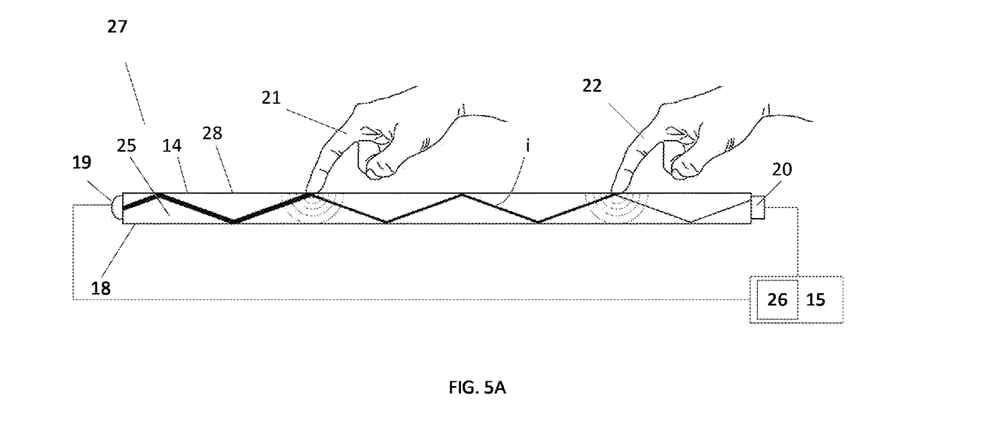
FIG. 5A illustrates a side view of a touch sensing arrangement.
Figure 5B:
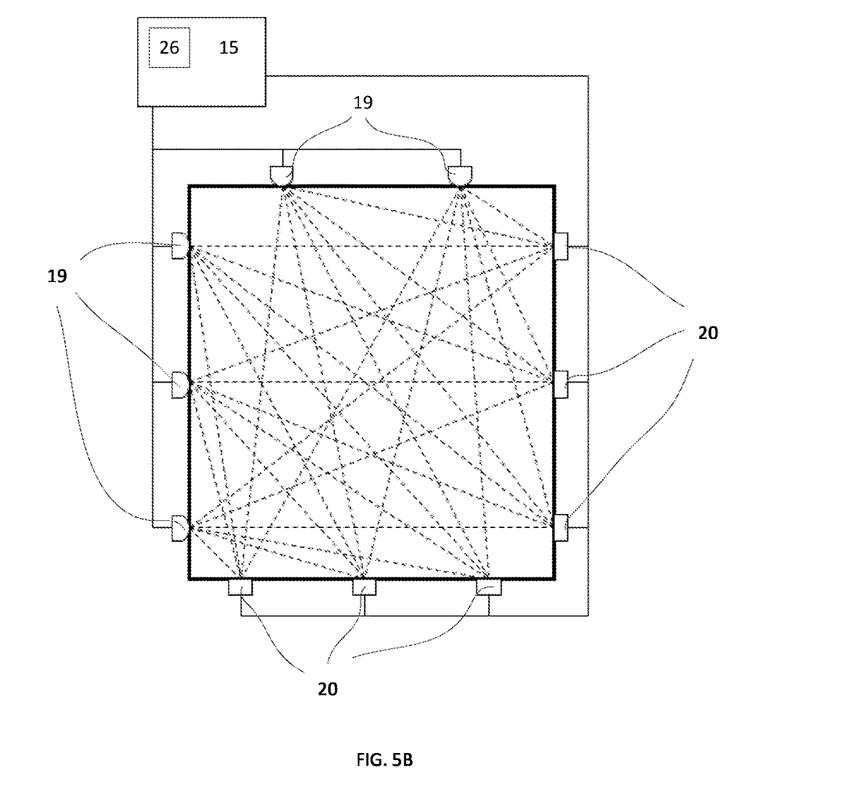
FIG. 5B is a top plan view of an embodiment of the touch sensing arrangement of FIG. 5A.

The touch surface 14 may be part of a touch sensitive display, a touch sensitive screen or a light transmissive panel 25 (FIG. 5A-5B). With the last alternative the light transmissive panel 25 is then overlaid on or integrated in a display and may be denoted a "touch sensitive screen", or only "touch screen". The touch sensitive display or screen may use LCD (Liquid Crystal Display) technology, LPD (Light Emitting Polymer) technology, OLED (Organic Light Emitting Diode) technology or any other display technology. The GUI displays visual output to the user via the display, and the visual output is visible via the touch surface 14. The visual output may include text, graphics, video and any combination thereof.

The touch surface 14 is configured to receive "touch inputs" from one or several users. A "touch input" is a touch on the touch surface 14 from a touching object giving rise to one or several interactions. An "interaction" occurs when the touching object affects a parameter measured by a sensor. The touch arrangement 2, the touch surface 14 and the touch control unit 15 together with any necessary hardware and software, depending on the touch technology used, detect the touch inputs. The touch arrangement 2, the touch surface 14 and touch control unit 15 may also detect touch input including movement of the touch inputs using any of a plurality of known touch sensing technologies capable of detecting simultaneous contacts with the touch surface 14. Such technologies include capacitive, resistive, infrared, and surface acoustic wave technologies. An example of a touch technology which uses light propagating inside a panel will be explained in connection with FIG. 5A-5B.

The touch arrangement 2 is configured to generate and send the touch inputs as one or several signals $s_y$ to the touch control unit 15. The touch control unit 15 is configured to receive the one or several signals $s_y$ and comprises software and hardware to analyse the received signals $s_y$, and to determine touch input data including sets of positions $x_{nt}$, $y_{nt}$ with associated pressure $p_t$ on the touch surface 14 by processing the signals $s_y$. Each set of touch input data $x_{nt}$, $y_{nt}$, $p_{nt}$ may also include identification, an ID, identifying to which touch input the data pertain. Here "n" denotes the identity of the touch input. If the touch input is still or moved over the touch surface 14, without losing contact with it, a plurality of touch input data $x_{nt}$, $y_{nt}$, $p_{nt}$ with the same ID will be determined. If the touching object making the touch input is taken away from the touch surface 14 (i.e. a "touch up"), there will be no more touch input data with this ID. Touch input data from a touch input may also comprise an area $a_{nt}$ of the touch. A position $x_{nt}$, $y_{nt}$ referred to herein is then a centre of the area $a_{nt}$. A position may also be referred to as a location. The touch control unit 15 is further configured to generate one or several touch signals $s_x$ comprising the touch input data, and to send the touch signals $s_x$ to a processor 12 in the gesture interpretation unit 13. The processor 12 may e.g. be a computer programmable unit (CPU). The gesture interpretation unit 13 also comprises a computer readable storage medium 11, which may include a volatile memory such as high speed random access memory (RAM-memory) and/or a non-volatile memory such as a flash memory.

The computer readable storage medium 11 comprises a touch module 16 (or set of instructions), and a graphics module 17 (or set of instructions). The computer readable storage medium 11 comprises computer programming instructions which, when executed on the processor 12, are configured to carry out the method according to any of the steps described herein. These instructions can be seen as divided between the modules 16, 17. The computer readable storage medium 11 may also store received touch input data comprising positions $x_{nt}$, $y_{nt}$ on the touch surface 14 and pressures $p_t$ of the touch inputs. The touch module 16 includes instructions to determine from the touch input data if the touch inputs have certain characteristics, such as being in a predetermined relation to each other and/or a graphical interactive object 1, and/or if one or several of the touch inputs are moving, and/or if continuous contact with the touch surface 14 is maintained or is stopped, and/or the pressure of the one or several touch inputs. The touch module 16 thus keeps track of the touch inputs, and thus the touching objects. Determining movement of a touch input may include determining a speed (magnitude), velocity (magnitude and direction) and/or acceleration (magnitude and/or direction) of the touch input or inputs.

The graphics module 17 includes instructions for rendering and displaying graphics via the GUI. The graphics module 17 controls the position, movements, and actions etc. of the graphics. More specifically, the graphics module 17 includes instructions for displaying at least one graphical interactive object 1 (FIG. 4A-4D) on or via the GUI and moving it and make it react in response to certain determined touch inputs. The term "graphical" include any visual object that can be presented on the GUI and be visible for the user, such as text, icons, digital images, animations or the like. The term "interactive" includes any object that a user can affect via touch inputs to the GUI. For example, if the user makes touch inputs on the touch surface 14 according to the method when a graphical interactive object 1 is displayed, the graphical interactive object 1 will react to the touch inputs as will be explained in the following. The processor 12 is configured to generate signals $s_z$ or messages with instructions to the GUI how the graphical interactive object 1 shall be processed and controlled, e.g. moved, change its appearance etc. The processor 12 is further configured to send the signals $s_z$ or messages to the touch arrangement 2, where the GUI via a display is configured to receive the signals $s_z$ or messages and control the graphical interactive object 1 according to the instructions.

The gesture interpretation unit 13 may thus be incorporated in any known touch sensing device 3 with a touch surface 14, wherein the device 3 is capable of presenting the graphical interactive object 1 via a GUI visible on the touch surface 14, detect touch inputs on the touch surface 14 and to generate and deliver touch input data to the processor 12. The gesture interpretation unit 13 is then incorporated into the device 3 such that it can process the graphical interactive object 1 in predetermined ways when certain touch data has been determined.

2. Gesture

Figure 2:
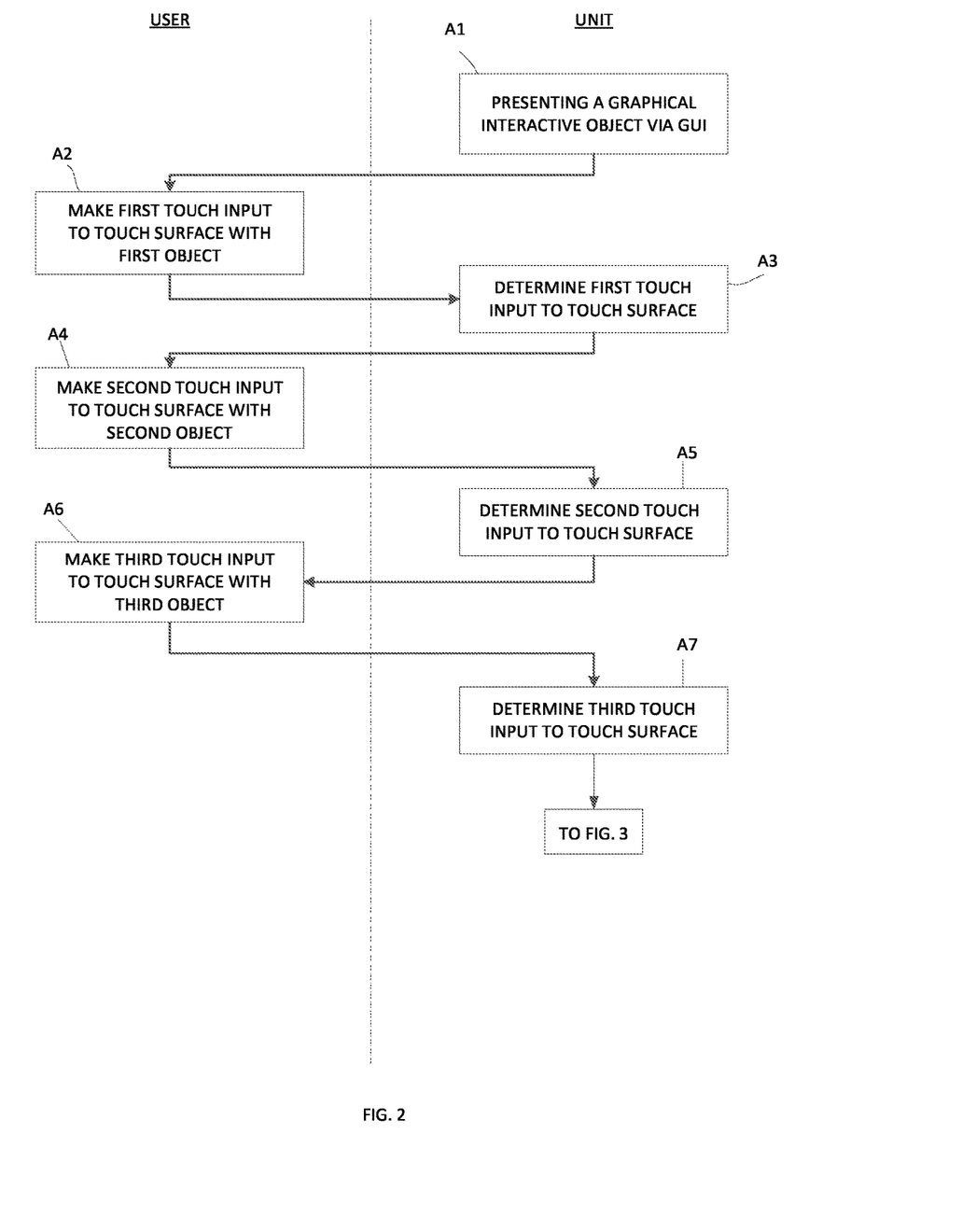
FIGS. 2-3 are flowcharts of the method according to some embodiments of the invention.
Figure 3:
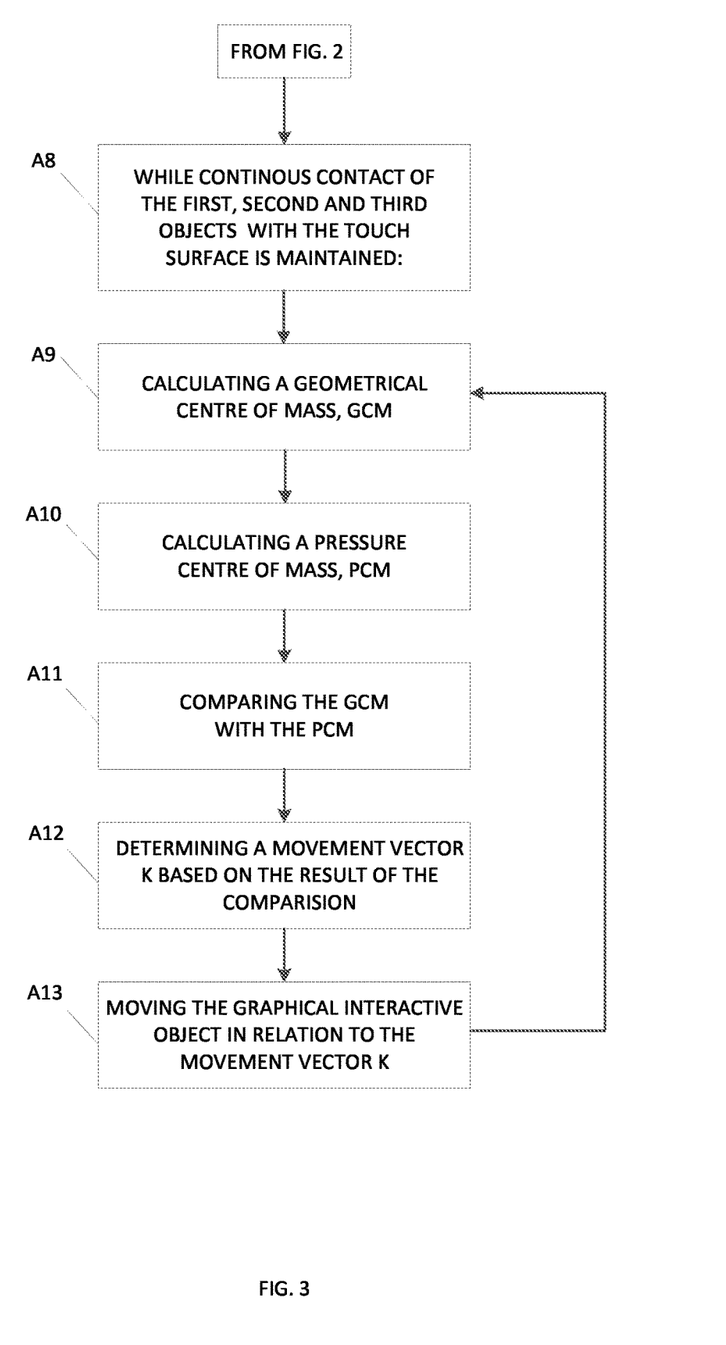

FIGS. 2 and 3 is a flowchart illustrating a method according to some embodiments of the invention, when a user interacts with a graphical interactive object 1 according to a certain pattern. The left side of the flowchart in FIG. 2 illustrates the touch inputs made by a user, and the right side of the flowchart illustrates how the gesture interpretation unit 13 responds to the touch inputs. The left and the right sides of the flowchart are separated by a dotted line. The method may be preceded by setting the touch sensing device 3 in a certain state, e.g. an interaction state such as a joystick state. This certain state may invoke the function of the gesture interpretation unit 13, whereby the method which will now be described with reference to FIGS. 2 and 3 can be executed.

At first, the graphical interactive object 1 is presented via the GUI of the touch sensing device 3 (A1). The graphical interactive object 1 may be a graphical interactive object 1 in a game or in any other computer environment, and by e.g. an aeroplane, a car, an animated person etc. The user may now initiate interaction with the graphical interactive object 1 by making certain touch inputs on the touch surface 14. To create the function of a virtual joystick, the user makes a first touch input 4 on the touch surface 14 with a first object 5 (A2). The first touch input 4 to the touch surface 14 can then be determined, including a first position 6 $x_{1t}$, $y_{1t}$ of the first object 5 on the touch surface 14 (A3). The user now makes a second touch input 7 to the touch surface 14 with a second object 8 (A4). The second touch input to the touch surface 14 can then be determined, including a second position 9 $x_{2t}$, $y_{2t}$ of the second object 8 on the touch surface 14 (A5). The user also makes a third touch input 10 with a third object 23 on the touch surface 14 (A6). The third touch input to the touch surface 14 can then be determined, including a third position 24 $x_{3t}$, $y_{3t}$ of the third object 23 on the touch surface 14 (A7). The first, second and third objects 5, 8, 23 are present on the touch surface 2 during overlapping time periods. The first, second and third objects 5, 8, 23 may simultaneously touch the touch surface 14, and the corresponding touch inputs 4, 7, 10 can then be simultaneously detected and determined. According to one embodiment, at least one further touch input from a further object 30 at a further position 31 on the touch surface 14 is determined, as illustrated in FIG. 4D.

The method now continues as illustrated in the flowchart in FIG. 3. While continuous contact of the first 5, second 8, third 23 objects and if present, any further object or objects 30 with the touch surface 14 is maintained (A8), the following steps A9-A13 are performed. A further prerequisite for the method to perform the steps A9-A13 is according to one embodiment that the positions 6, 9, 24 of the first, second and third objects 5, 8, 23 are within a certain area, and/or that the distances between the positions 6, 9, 24 are within certain limits, and/or that the positions 6, 9, 24 are spread in a certain pattern. The area, limits and/or pattern may e.g. correspond to characteristics of a hand and/or fingers.

In A9, a geometric centre of mass (GCM) is calculated for the first, second and third touch inputs 4, 7, 10 using positioning data $x_{nt}$, $y_{nt}$ for the touch inputs. Here, n denotes the identity and t time of the positioning data. The geometric centre of mass, also called geometric centre or centroid, is the geometric centre of an area limited by the positions $x_{nt}$, $y_{nt}$ for the touch inputs in a plane parallel to the touch surface 14. Thus, if three touch inputs have been determined, the shape of the area is a triangle. The geometric centre $X_{GMC}$, $Y_{GMC}$ may then be calculated by using the equations below:

$$X_{GCM} = \frac{\sum m_i \cdot x_i}{\sum m_i}, Y_{GCM} = \frac{\sum m_i \cdot y_i}{\sum m_i} \quad (1)$$

wherein in denotes the mass of the position i, $x_i$ is the distance from an origo to the position i in the x-direction in a coordinate system, and $y_i$ is the distance from origo to the position i in the y-direction in the coordinate system. For calculating the geometric centre of mass, the mass $m_i$ is set to 1.

In A10, a pressure centre of mass (PCM) is calculated for the first, second and third touch inputs 4, 7, 10 using pressure data $p_{nt}$ for the touch inputs. According to one embodiment, the pressure data $p_{nt}$ for the touch inputs is normalized before the PCM is calculated. The pressure data $p_{nt}$, or force data, is according to one embodiment calculated with the same equations (1) as used for calculating the geometric centre of mass. $m_i$ then denotes the pressure, or force, of the position i. Thus, an x-coordinate $X_{PCM}$ and a y-coordinate $Y_{PCM}$ is calculated which corresponds to the instantaneous pressure centre of mass. The coordinates are determined in the same coordinate system as the GCM.

If any further object 30, 33 also is present and touch input data for this object 30, 33 has been determined, a geometric centre of mass and a pressure centre of mass is calculated using also touch input data from this or these further touch input(s). According to one embodiment, it is also determined that the touch input data from this or these further object(s) is/are grouped together with the other determined touch input data. For example, the position(s) of the further object(s) has to be within a predetermined distance to the positions of the other determined touch input data.

Thereafter, the geometric centre of mass (GCM) is compared with the pressure centre of mass (PCM) (A11), and a movement vector k is determined based on the result of the comparison (A12). The movement vector k is established by comparing $X_{GCM}$ with $X_{PCM}$ and determining the difference, $X_{DIFF}$, and comparing $Y_{GCM}$ with $Y_{PCM}$ and determining the difference, $Y_{DIFF}$. The extensions of the movement vector k along an x-axis and y-axis in a coordinate system having its origo in the GCM, are then made up of the differences $X_{DIFF}$ and $Y_{DIFF}$. The graphical interactive object 1 is then moved in relation to the movement vector k (A13). Thus, the function of a virtual joystick has been created. As understood the graphical interactive object 1 is most commonly moved in relation to the latest position of the graphical interactive object 1 itself.

As long as continuous contact of the first, second and third objects 5, 8, 23, and any further object 30, 33 with the touch surface is maintained, the method hereafter returns to A9 as illustrated in the flowchart and continuously determines a movement vector k according to which the graphical interactive object 1 is moved. Thus, new positions $x_{nt}$, $y_{nt}$ and pressures $p_{nt}$ are continuously determined from the touch input data, such that new GCM and PCM continuously can be determined. Thus, if any of the objects 5, 8, 23 etc are moved over the touch surface 14, new positions of the objects 5, 8, 23 etc will be determined and used for determining a new GCM. According to one embodiment, if the positions of the mentioned first, second, third etc. objects are the same, no new GCM has to be calculated.

The determined movement vector k has, if the differences $X_{DIFF}$ and $Y_{DIFF}$ are not both zero, a direction, and movement of the graphical interactive object 1 is made in relation to this direction. For example, the graphical interactive object 1 is moved in the same direction as the direction of the movement vector, or the graphical interactive object 1 may be configured to be moved in another direction determined in relation to the direction of the movement vector k, for example in the opposite direction of or in an angular relationship to the direction of the movement vector k. Each graphical interactive object 1, or set of graphical interactive objects 1, is then configured to react to a certain virtual joystick made up of the described touch inputs. A graphical interactive object 1 may for example be made to respond to a certain virtual joystick by e.g. touching on the graphical interactive object 1 and immediately after make the necessary touch inputs on the touch surface 14 to create the joystick function. According to another embodiment, certain areas on the touch surface 14 are dedicated to create virtual joysticks. The virtual joystick function may be invoked by setting the touch sensing device 3 in a certain state as has previously been explained.

The movement vector k also has a magnitude which is equal to the extension of the movement vector k in the coordinate system. The graphical interactive object 1 is according to one embodiment moved in relation to this magnitude. For example, a velocity or acceleration of the graphical interactive object 1 is set in relation to the magnitude.

Thus, if the magnitude is increased or decreased, the velocity or acceleration of the graphical interactive object 1 is changed accordingly in accordance with a scale ratio. If the magnitude is constant, the velocity or acceleration is for example then also constant. The velocity and/or acceleration may also be determined in relation to a time of which the movement vector k is determined. According to one embodiment, if the same or substantially the same vector k is determined in several subsequent time steps, the velocity or the acceleration of the graphical interactive object 1 is increased or decreased during the time steps.

According to one embodiment, the method comprises comparing the magnitude of the movement vector k with a threshold and moving the graphical interactive object 1 when the magnitude exceeds the threshold. The graphical interactive object 1 can then be prevented from moving when the user for example has unintentionally shaking hands or otherwise makes small pressure touch inputs not intended to move the graphical interactive object 1.

As long as continuous contact of the first, second, third, and any further object, is determined, the method continuous as illustrated in the flowchart in FIG. 3, and the movement vector k is continuously determined and the graphical interactive object 1 is moved in relation to the movement vector k.

The movement vector k is according to one embodiment determined in a two-dimensional plane of the GUI. For example, the two-dimensional plane is defined as an x-y-plane of the interactive graphical object 1. The x-y-plane may be parallel to the plane of the touch surface 14. The two-dimensional plane may instead be defined as a z-x-plane of the interactive graphical object 1, and thus perpendicular to the plane of the touch surface 14.

In the text and figures it is referred to only one graphical interactive object 1, but it is understood that a plurality of independent graphical interactive objects 1 may be displayed via the GUI at the same time and that one or several users may interact with and control the different graphical interactive objects 1 independently of each other as explained herein.

According to one embodiment, the graphical interactive object 1 is moved in relation to the movement vector k in a graphical environment of the GUI. The graphical interactive object 1 can then be moved in relation to the graphical environment in different manners. For example, the object 1 can be located in the same place on the GUI, and the graphical environment can be made to move such that it appears for the user as the object 1 is moved in the graphical environment when the user controls the object 1 via the touch inputs. Thus, the object 1 is moved in relation to the movement vector k, but it is the graphical environment that stages the movement such that the object 1 appears to the user as moving. For example, a movement of the object 1 in a coordinate system of the object 1 in relation to the determined movement vector k, is translated to a movement of the graphical environment such that the object 1 appears to move in relation to the movement vector k.

Figure 4A:
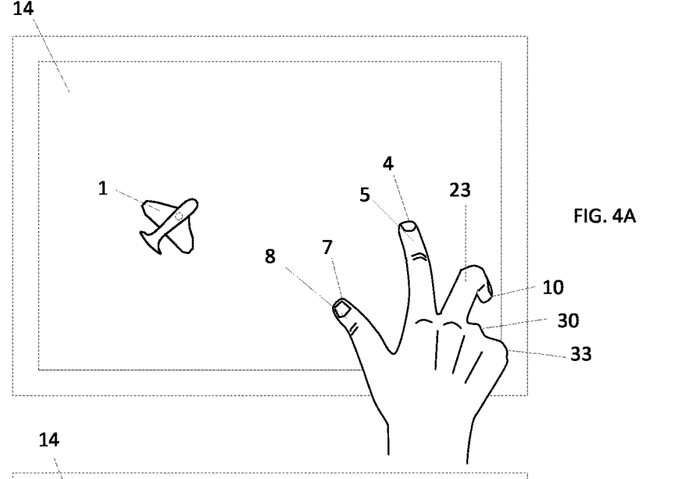
FIG. 4A illustrates a touch surface of a device when a graphical user interface object is presented via the GUI of the device.
Figure 4B:
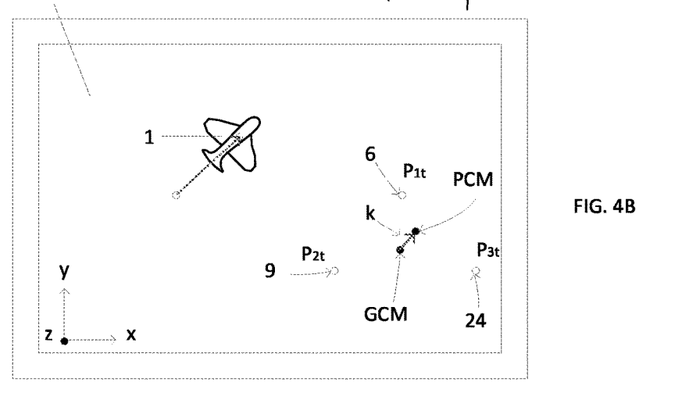
FIG. 4B-D illustrates the graphical interactive object presented via the GUI in FIG. 4A when a user controls the graphical interactive object via the virtual joystick according to some embodiments of the invention.
Figure 4C:
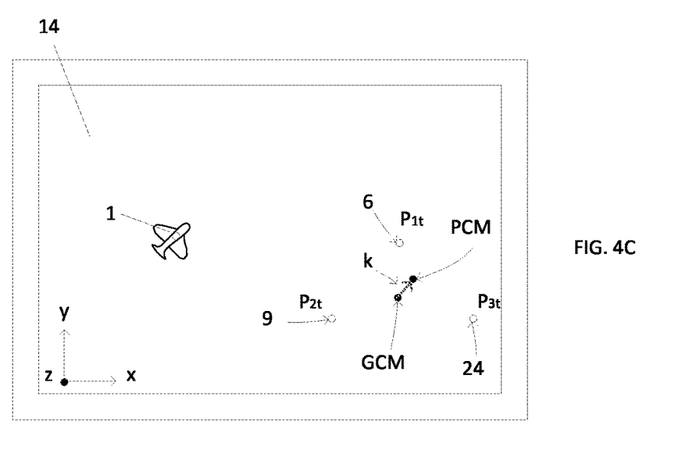
Figure 4D:
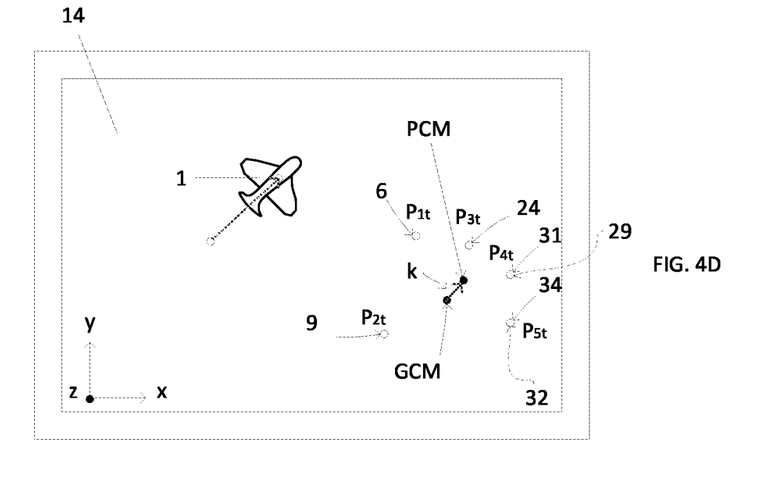

FIGS. 4A-4D illustrates the touch surface 14 of various points of performance of the method according to some embodiments of the invention. The touch surface 14 is part of the touch arrangement 2 (FIG. 1), and is here provided with a frame as illustrated in the figures. In FIG. 4A the graphical interactive object 1, here in the shape of a small airplane 1, is presented via the GUI and is visible from the touch surface 14. The airplane 1 is here located at a starting position denoted with a circle. In the figure the first 5, a second 8 and a third object 23 are illustrated in the shape of three fingers 5, 8, 23 of a user. The user has placed the first finger 5 at a first position 6 $x_{1t}, y_{1t}$, the second finger 8 at a second position 9 $x_{2t}, y_{2t}$ and the third finger 10 at a third position 24 $x_{3t}, y_{t3}$ on the touch surface 14. Touch inputs 4, 7 and 10 from the objects 5, 8, 23 are then detected by the touch control unit 15, and position coordinates and pressures for each touch input is determined. The position coordinates $x_{1t}, y_{1t}, x_{2t}, y_{2t}$ and $x_{3t}, y_{3t}$ and pressures of the touch inputs are receive to the processor 12 in the gesture interpretation unit 13 as touch input data. With instructions stored in the computer readable medium 11, the processor 12 now determines if the first 5, second 8 and third objects are present on the touch surface 14 during overlapping time periods. In this case the user holds her fingers 5, 8, 23 on the touch surface 14 during overlapping time periods. The user continues to hold her fingers 5, 8, 23 on the touch surface 14, and a geometric centre of mass, GCM, is calculated by the processor 12 (FIG. 1). The geometric centre of mass is indicated in the FIG. 4B. In the FIGS. 4B and 4C, the fingers 5, 8, 23 are removed to make it easier to explain the method, but the positions 6, 9, 24 of the fingers 5, 8, 23 are indicated in place of the fingers. The user acts upon the touch surface 14 with a pressure $p_{1t}$ at position 6, with a pressure $p_{2t}$ at position 9, and with a pressure $p_{3t}$ at position 24. A pressure centre of mass, PCM, is then calculated by the processor 1 (FIG. 1) using the pressure data and coordinates for each touch input. A movement vector k can then be determined as has previously been explained as a result of comparing the GCM with the PCM. The movement vector k is indicated in the figure as a small arrow. The graphical interactive object 1 is then moved in relation to the movement vector k. As understood the positions of the fingers 5, 8, 23 can be different than the positions indicated in the figure.

In FIGS. 4B and 4C, it is illustrated that the airplane 1 can be defined to be moved in different ways in relation to the movement vector k. The movement vector k is here determined in a two-dimensional plane of the GUI, and in FIG. 4B the two-dimensional plane is defined as the xy-plane of the airplane 1. The x-y-plane of the airplane 1 is here the same as the xy-plane of the touch surface 14. Thus, in response to a movement vector k with a certain direction, the airplane 1 is moved in e.g. the same direction as this certain direction. This is illustrated in the FIG. 4B where the airplane 1 has moved a distance from the starting position denoted by a circle. The distance is illustrated as a dotted line. As previously has been explained, the velocity and/or acceleration of the airplane 1 can be determined in accordance with the magnitude of the movement vector k. Thus, the user now controls the movement of the airplane 1 in the x-y-plane of the touch surface 14 by pressing on the touch surface 14 with her fingers. According to one embodiment, the airplane 1 is moved with a pre-set velocity or acceleration in the direction of the vector k.

In FIG. 4C, the airplane 1 is moved in relation to the movement vector k in a z-plane of the airplane 1. Thus, as illustrated in FIG. 4C, in response to a movement vector k in a certain direction, the airplane 1 is adjusted in the direction of the vector k, and "falls" along the z-axis as illustrated in the FIG. 4C as a smaller airplane 1. The further down the airplane 1 falls, the smaller appearance of the airplane 1. The airplane 1 can be configured to be moved in relation to the movement vector k in various ways. For example, if the movement vector k is in the opposite direction as illustrated in FIG. 4C, the airplane 1 can be configured to move in the opposite z-direction, and thus the airplane 1 will become closer to the user and the appearance of the airplane 1 will become larger. The z-axis is here an axis perpendicular to the xy-plane of the touch surface 14.

According to another example, the graphical interactive object 1 is moved in relation to the movement vector k around an axis in the xyz-plane of the graphical interactive object 1. The axis has according to one embodiment an extension in a crosswise direction of the graphical interactive object 1. The crosswise direction is e.g. a direction perpendicular to a movement direction of the graphical interactive object 1. The graphical interactive object 1 can then be configured to be rotated 360° around the axis such that it can be seen from different views. The axis may according to another embodiment be placed a distance from the graphical interactive object 1, such that the object 1 then can rotate along a periphery of a circle with its centre in the axis and a radius corresponding to the distance. The vector k is according to one embodiment scaled to an area of the touch surface 14. The magnitude of the vector k does never exceed a boundary made up of straight lines connecting the positions 6, 9, 24 etc. of the first, second and third objects 5, 8, 23. The area made up of this boundary may be scaled to an area of the touch surface 14 where the graphical interactive object 1 can be active. A certain magnitude of the vector k then corresponds to e.g. a velocity, acceleration or distance adapted to the area of the touch surface 14.

In FIG. 4D a further example is illustrated where the user has placed five fingers on the touch surface 14 in order to create the function of a virtual joystick. The fingers may belong to the same hand. The fingers are here not shown for sake of simplicity, but the positions on the touch surface 14 of the touch inputs from the fingers are indicated. As illustrated the first finger 5 gives rise to a first position 6, the second finger 8 gives rise to a second position 9, the third finger 23 gives rise to a third position 24, a fourth finger 30 (FIG. 3A) gives rise to a fourth position 31 and a fifth finger 33 (FIG. 3A) gives rise to a fifth position 34. The touch inputs may of course come from other objects than fingers. The first finger 5 is also referred to as a first object 5, the second finger 8 as a second object 8, the third finger 23 as a third object 23, the fourth finger 30 as a further object 30 and a fifth finger 33 as a still further object 33. It has previously been explained that the first, second and third touch inputs 4, 7, 10 have been determined, and now also a further touch input 29 from the fourth object 30 at a fourth position 31, and a still further touch input 32 from the fifth object 33 at a fifth position 34 on the touch surface 13 are determined. All the objects 5, 8, 23, 30, 33 are present on the touch surface 14 during overlapping time periods. In the FIG. 4D only the touch inputs from the fourth and fifth objects 29 and 32 are denoted for simplicity. While continuous contact of the objects 5, 8, 23, 30, 33 with the touch surface 14 is maintained, a geometric centre of mass, GCM, is calculated for the touch inputs 4, 7, 10, 29, 32 using positioning data $x_{nt}$, $y_{nt}$ for the touch inputs. Every touch input also gives rise to a pressure. As indicated in the figure, the first finger 5 gives rise to a first pressure $p_{1t}$, the second finger 8 gives rise to a second pressure $p_{2t}$, the third finger 23 gives rise to a third pressure $p_{3t}$, the fourth finger gives rise to a fourth pressure $p_{4t}$ and the fifth finger gives rise to a fifth pressure $p_{5t}$. Also, a pressure centre of mass, PCM, is calculated for the touch inputs 4, 7, 10, 29, 32 using pressure data $p_{nt}$ ($p_{1t}$, $p_{2t}$, $p^{3t}$, $p_{4t}$ and $p_{5t}$) for the touch inputs. The pressures may be normalized as has previously been explained. The GCM and the PCM are now compared and a movement vector k is determined based on the result of the comparison, thus the differences between the GCM and PCM as has previously been explained. The graphical interactive object 1 is then moved in relation to the movement vector k as has previously been explained.

3. Touch Technology Based on FTIR

As explained before, the invention can be used together with several kinds of touch technologies. One kind of touch technology based on FTIR will now be explained. The touch technology can advantageously be used together with the invention to deliver touch input data $x_{nt}$, $y_{nt}$, $p_{nt}$ to the processor 12 of the gesture interpretation unit 13 (FIG. 1).

In FIG. 5A a side view of an exemplifying arrangement 27 for sensing touches in a known touch sensing device is shown. The arrangement 27 may e.g. be part of the touch arrangement 2 illustrated in FIG. 1A. The arrangement 27 includes a light transmissive panel 25, a light transmitting arrangement comprising one or more light emitters 19 (one shown) and a light detection arrangement comprising one or more light detectors 20 (one shown). The panel 25 defines two opposite and generally parallel top and bottom surfaces 28, 18 and may be planar or curved. In FIG. 5A, the panel 25 is rectangular, but it could have any extent. A radiation propagation channel is provided between the two boundary surfaces 28, 18 of the panel 25, wherein at least one of the boundary surfaces 28, 18 allows the propagating light to interact with one or several touching object 21, 22. Typically, the light from the emitter(s) 19 propagates by total internal reflection (TR) in the radiation propagation channel, and the detector(s) 20 are arranged at the periphery of the panel 25 to generate a respective output signal which is indicative of the energy of received light.

As shown in the FIG. 5A, the light may be coupled into and out of the panel 25 directly via the edge portions of the panel 25 which connects the top 28 and bottom surfaces 18 of the panel 25. The previously described touch surface 14 is according to one embodiment at least part of the top surface 28. The detector(s) 20 may instead be located below the bottom surface 18 optically facing the bottom surface 18 at the periphery of the panel 25. To direct light from the panel 25 to the detector(s) 20, coupling elements might be needed. The detector(s) 20 will then be arranged with the coupling element(s) such that there is an optical path from the panel 25 to the detector(s) 20. In this way, the detector(s) 20 may have any direction to the panel 25, as long as there is an optical path from the periphery of the panel 25 to the detector(s) 20. When one or several objects 21, 22 is/are touching a boundary surface of the panel 25, e.g. the touch surface 14, part of the light may be scattered by the object(s) 21, 22, part of the light may be absorbed by the object(s) 21, 22 and part of the light may continue to propagate unaffected. Thus, when the object(s) 21, 22 touches the touch surface 14, the total internal reflection is frustrated and the energy of the transmitted light is decreased. This type of touch-sensing apparatus is denoted "FTIR system" (FTIR—Frustrated Total Internal Reflection) in the following. A display may be placed under the panel 25, i.e. below the bottom surface 18 of the panel. The panel 25 may instead be incorporated into the display, and thus be a part of the display.

The location of the touching objects 21, 22 may be determined by measuring the energy of light transmitted through the panel 25 on a plurality of detection lines. This may be done by e.g. operating a number of spaced apart light emitters 19 to generate a corresponding number of light sheets into the panel 25, and by operating the light detectors 20 to detect the energy of the transmitted energy of each light sheet. The operating of the light emitters 19 and light detectors 20 may be controlled by a touch processor 26. The touch processor 26 is configured to process the signals from the light detectors 20 to extract data related to the touching object or objects 21, 22. The touch processor 26 is part of the touch control unit 15 as indicated in the figures. A memory unit (not shown) is connected to the touch processor 26 for storing processing instructions which, when executed by the touch processor 26, performs any of the operations of the described method.

The light detection arrangement may according to one embodiment comprise one or several beam scanners, where the beam scanner is arranged and controlled to direct a propagating beam towards the light detector(s).

As indicated in FIG. 5A, the light will not be blocked by a touching object 21, 22. If two objects 21 and 22 happen to be placed after each other along a light path from an emitter 19 to a detector 20, part of the light will interact with both these objects 21, 22. Provided that the light energy is sufficient, a remainder of the light will interact with both objects 21, 22 and generate an output signal that allows both interactions (touch inputs) to be identified. Normally, each such touch input has a transmission in the range 0-1, but more usually in the range 0.7-0.99. The total transmission $t_i$ along a light path i is the product of the n individual transmissions $t_k$ of the touch points on the light path: $t_i = \Pi_{k=1}^{n} t_k$. Thus, it may be possible for the touch processor 26 to determine the locations of multiple touching objects 21, 22, even if they are located in the same line with a light path.

FIG. 5B illustrates an embodiment of the FTIR system, in which a light sheet is generated by a respective light emitter 19 at the periphery of the panel 25. Each light emitter 19 generates a beam of light that expands in the plane of the panel 25 while propagating away from the light emitter 19. Arrays of light detectors 20 are located around the perimeter of the panel 25 to receive light from the light emitters 19 at a number of spaced apart outcoupling points within an outcoupling site on the panel 25. As indicated by dashed lines in FIG. 5B, each sensor-emitter pair 19, 20 defines a detection line. The light detectors 20 may instead be placed at the periphery of the bottom surface 18 of the touch panel 25 and protected from direct ambient light propagating towards the light detectors 20 at an angle normal to the touch surface 14. One or several detectors 20 may not be protected from direct ambient light, to provide dedicated ambient light detectors.

The detectors 20 collectively provide an output signal, which is received and sampled by the touch processor 26. The output signal contains a number of sub-signals, also denoted "projection signals", each representing the energy of light emitted by a certain light emitter 19 and received by a certain light sensor 20. Depending on implementation, the processor 26 may need to process the output signal for separation of the individual projection signals. As will be explained below, the processor 26 may be configured to process the projection signals so as to determine a distribution of attenuation values (for simplicity, referred to as an "attenuation pattern") across the touch surface 14, where each attenuation value represents a local attenuation of light.

4. Data Extraction Process in an FTIR System

Figure 6:
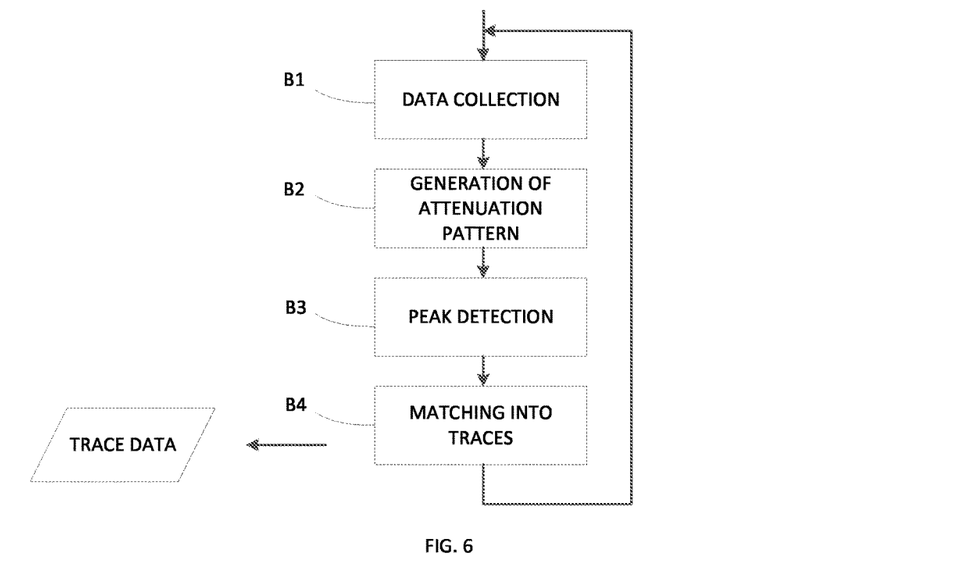
FIG. 6 is a flowchart of a data extraction process in the device of FIG. 5B.

FIG. 6 is a flow chart of a data extraction process in an FTIR system. The process involves a sequence of steps B1-B4 that are repeatedly executed, e.g. by the touch processor 26 (FIG. 5A). In the context of this description, each sequence of steps B1-B4 is denoted a frame or iteration. The process is described in more detail in the Swedish application No 1251014-5, filed on Sep. 11, 2012, which is incorporated herein in its entirety by reference.

Each frame starts by a data collection step B1, in which measurement values are obtained from the light detectors 20 in the FTIR system, typically by sampling a value from each of the aforementioned projection signals. The data collection step B1 results in one projection value for each detection line. It may be noted that the data may, but need not, be collected for all available detection lines in the FTIR system. The data collection step B1 may also include pre-processing of the measurement values, e.g. filtering for noise reduction.

In a reconstruction step B2, the projection values are processed for generation of an attenuation pattern. Step B2 may involve converting the projection values into input values in a predefined format, operating a dedicated reconstruction function on the input values for generating an attenuation pattern, and possibly processing the attenuation pattern to suppress the influence of contamination on the touch surface (fingerprints, etc.).

In a peak detection step B3, the attenuation pattern is then processed for detection of peaks, e.g. using any known technique. In one embodiment, a global or local threshold is first applied to the attenuation pattern, to suppress noise. Any areas with attenuation values that fall above the threshold may be further processed to find local maxima. The identified maxima may be further processed for determination of a touch shape and a center position, e.g. by fitting a two-dimensional second-order polynomial or a Gaussian bell shape to the attenuation values, or by finding the ellipse of inertia of the attenuation values. There are also numerous other techniques as is well known in the art, such as clustering algorithms, edge detection algorithms, standard blob detection, water shedding techniques, flood fill techniques, etc. Step B3 results in a collection of peak data, which may include values of position, attenuation, size, and shape for each detected peak. The attenuation may be given by a maximum attenuation value or a weighted sum of attenuation values within the peak shape.

In a matching step B4, the detected peaks are matched to existing traces, i.e. traces that were deemed to exist in the immediately preceding frame. A trace represents the trajectory for an individual touching object on the touch surface as a function of time. As used herein, a "trace" is information about the temporal history of an interaction. An "interaction" occurs when the touch object affects a parameter measured by a sensor. Touches from an interaction detected in a sequence of frames, i.e. at different points in time, are collected into a trace. Each trace may be associated with plural trace parameters, such as a global age, an attenuation, a location, a size, a location history, a speed, etc. The "global age" of a trace indicates how long the trace has existed, and may be given as a number of frames, the frame number of the earliest touch in the trace, a time period, etc. The attenuation, the location, and the size of the trace are given by the attenuation, location and size, respectively, of the most recent touch in the trace. The "location history" denotes at least part of the spatial extension of the trace across the touch surface, e.g. given as the locations of the latest few touches in the trace, or the locations of all touches in the trace, a curve approximating the shape of the trace, or a Kalman filter. The "speed" may be given as a velocity value or as a distance (which is implicitly related to a given time period). Any known technique for estimating the tangential speed of the trace may be used, taking any selection of recent locations into account. In yet another alternative, the "speed" may be given by the reciprocal of the time spent by the trace within a given region which is defined in relation to the trace in the attenuation pattern. The region may have a pre-defined extent or be measured in the attenuation pattern, e.g. given by the extent of the peak in the attenuation pattern.

The matching step B4 may be based on well-known principles and will not be described in detail. For example, step B4 may operate to predict the most likely values of certain trace parameters (location, and possibly size and shape) for all existing traces and then match the predicted values of the trace parameters against corresponding parameter values in the peak data produced in the peak detection step B3. The prediction may be omitted. Step B4 results in "trace data", which is an updated record of existing traces, in which the trace parameter values of existing traces are updated based on the peak data. It is realized that the updating also includes deleting traces deemed not to exist (caused by an object being lifted from the touch surface 14, "touch up"), and adding new traces (caused by an object being put down on the touch surface 14, "touch down").

Following step B4, the process returns to step B1. It is to be understood that one or more of steps B1-B4 may be effected concurrently. For example, the data collection step B1 of a subsequent frame may be initiated concurrently with any one of the steps B2-B4. The result of the method steps B1-B4 is trace data, which includes data such as positions $(x_{nt}, y_{nt})$ for each trace. This data has previously been referred to as touch input data.

5. Detect Pressure

The current attenuation of the respective trace can be used for estimating the current application force for the trace, i.e. the force by which the user presses the corresponding touching object against the touch surface. The estimated quantity is often referred to as a "pressure", although it typically is a force. The process is described in more detail in the above-mentioned application No. 1251014-5. It should be recalled that the current attenuation of a trace is given by the attenuation value that is determined by step B2 (FIG. 6) for a peak in the current attenuation pattern.

According to one embodiment, a time series of estimated force values is generated that represent relative changes in application force over time for the respective trace. Thereby, the estimated force values may be processed to detect that a user intentionally increases or decreases the application force during a trace, or that a user intentionally increases or decreases the application force of one trace in relation to another trace.

Figure 7:
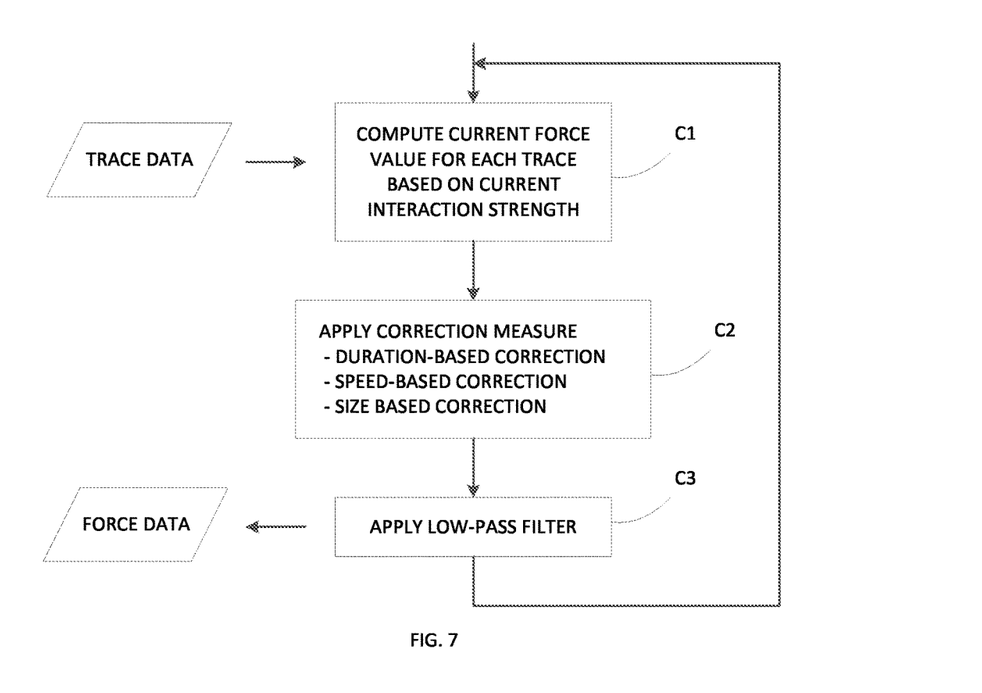
FIG. 7 is a flowchart of a force estimation process that operates on data provided by the process in FIG. 6.

FIG. 7 is a flow chart of a force estimation process according to one embodiment. The force estimation process operates on the trace data provided by the data extraction process in FIG. 6. It should be noted that the process in FIG. 7 operates in synchronization with the process in FIG. 6, such that the trace data resulting from a frame in FIG. 6 is then processed in a frame in FIG. 7. In a first step C1, a current force value for each trace is computed based on the current attenuation of the respective trace given by the trace data. In one implementation, the current force value may be set equal to the attenuation, and step C1 may merely amount to obtaining the attenuation from the trace data. In another implementation, step C1 may involve a scaling of the attenuation. Following step C1, the process may proceed directly to step C3. However, to improve the accuracy of the estimated force values, step C2 applies one or more of a number of different corrections to the force values generated in step C1. Step C2 may thus serve to improve the reliability of the force values with respect to relative changes in application force, reduce noise (variability) in the resulting time series of force values that are generated by the repeated execution of steps C1-C3, and even to counteract unintentional changes in application force by the user. As indicated in FIG. 7, step C2 may include one or more of a duration correction, a speed correction, and a size correction. The low-pass filtering step C3 is included to reduce variations in the time series of force values that are produced by step C1/C2. Any available low-pass filter may be used.

Thus, each trace now also has force values, thus, the trace data includes positions $(x_{nt}, y_{nt})$ and forces (also referred to as pressure) $(p_{nt})$ for each trace. These data can be used as touch input data to the gesture interpretation unit 13 (FIG. 1).

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method, comprising:
   presenting a graphical interactive object on a graphical user interface (GUI) of a touch sensing device, wherein the GUI is visible via a touch surface of the touch sensitive device;
   receiving touch input data indicating touch inputs on the touch surface of the touch sensing device, wherein the touch input data includes positioning data $x_{nt}, y_{nt}$ and pressure data $p_{nt}$ for each touch input;
   determining, from said touch input data,
     a first touch input from a first object at a first position on the touch surface,
     a second touch input from a second object at a second position on the touch surface, and
     a third touch input from a third object at a third position on the touch surface, wherein said first, second and third objects are present on the touch surface during overlapping time periods; and
   while continuous contact of said first, second and third objects with the touch surface is maintained calculating a geometric centre of mass (GCM) for a shape defined by positions $x_{nt}$, $y_{nt}$ of at least three touch inputs, calculating, for said at least three touch inputs, a pressure centre of mass (PCM) based on the positions $x_{nt}$, $y_{nt}$, and pressure data $p_{nt}$ of each of said at least three touch inputs, comparing said GCM with said PCM to determine an x-component distance and a y-component distance between the GCM and the PCM, determining a movement vector k based on the comparison, the movement vector k having a magnitude and a direction, and extensions of the movement vector k being the x-component distance and the y-component distance in a plane of the touch surface with the GCM as the origin of the movement vector k, and moving the graphical interactive object in relation to the movement vector k.

2. The method according to claim 1, further comprising: normalising said pressure data $p_{nt}$ for said at least three touch inputs.

3. The method according to claim 1, further comprising: determining the movement vector k based on a difference between the GCM and the PCM.

4. The method according to claim 3, wherein the moving comprises:
comparing the magnitude of the movement vector k with a threshold; and
moving the graphical interactive object when the magnitude exceeds the threshold.

5. The method according to claim 1, wherein the movement vector k is determined in a two-dimensional plane of the GUI.

6. The method according to claim 5, wherein the two-dimensional plane is defined as a x-y-plane of the graphical interactive object.

7. The method according to claim 6, wherein the moving comprises:
moving the graphical interactive object in relation to the movement vector k in a z-plane of the graphical interactive object.

8. The method according to claim 1, further comprising:
determining from said touch input data a further touch input from a further object at a further position on the touch surface, wherein
the calculating a geometric centre of mass (GCM) and the calculating a pressure centre of mass (PCM) include using touch input data from the further touch input.

9. A non-transitory computer readable storage medium comprising computer programming instructions which, when executed on a processor, causes the processor to carry out the method of claim 1.

10. The method according to claim 1, wherein the first, second and third touch inputs are entirely on portions of the touch surface configured to detect the positions $x_{nt}$, $y_{nt}$, and the pressure data $p_{nt}$ for the first, second and third touch inputs.

11. A gesture interpretation unit including a processor configured to receive touch input data indicating touch inputs on a touch surface of a touch sensing device, wherein the touch input data includes positioning data $x_{nt}$, $y_{nt}$ and pressure data $p_{nt}$ for each touch input, the gesture interpretation unit further including a non-transitory computer readable storage medium storing instructions operable to cause the processor to perform a method comprising:

presenting a graphical interactive object via a graphical user interface (GUI), wherein the GUI is visible via the touch surface;

determining from said touch input data
a first touch input from a first object at a first position on the touch surface,
a second touch input from a second object at a second position on the touch surface, and
a third touch input from a third object at a third position on the touch surface, wherein said first, second and third objects are present on the touch surface during overlapping time periods; and while continuous contact of said first, second and third objects with the touch surface is maintained
calculating a geometric centre of mass (GCM) for a shape defined by positions $x_{nt}$, $y_{nt}$ of at least three touch inputs,
calculating, for said at least three touch inputs, a pressure centre of mass (PCM) based on the positions $x_{nt}$, $y_{nt}$, and pressure data $p_{nt}$ of each of said at least three touch inputs,
comparing said GCM with said PCM to determine an x-component distance and a v-component distance between the GCM and the PCM,
determining a movement vector k based on the comparison, the movement vector k having a magnitude and a direction, and extensions of the movement vector k being the x-component distance and the y-component distance in a plane of the touch surface with the GCM as the origin of the movement vector k, and
moving the graphical interactive object in relation to the movement vector k.

12. The unit according to claim 11, further including instructions for normalising said pressure data $p_{nt}$ for said at least three touch inputs.

13. The unit according to claim 11, further including instructions for determining the movement vector k based on a difference between the GCM and the PCM.

14. The unit according to claim 13, further including instructions for comparing the magnitude with a threshold, and moving the graphical interactive object when the magnitude exceeds the threshold.

15. The unit according to claim 11, further including instructions for determining the movement vector k in a two-dimensional plane of the GUI.

16. The unit according to claim 15, wherein the two-dimensional plane is defined as a x-y-plane of the graphical interactive object.

17. The unit according to claim 16, further including instructions for moving the graphical interactive object in relation to the movement vector k in a z-plane of the graphical interactive object.

18. The unit according to claim 11, further including instructions for determining, from said touch input data, a further touch input from a further object of a user at a further position on the touch surface, and the calculating a geometric centre of mass (GCM) and the calculating a pressure centre of mass (PCM) include using touch input data from the further touch input.

19. The unit according to claim 11, wherein the touch sensing device is a Frustrated Total Internal Reflection (FTIR)-based touch sensing device.

20. A touch sensing device comprising:
a touch arrangement including a touch surface, wherein the touch arrangement is configured to detect touch inputs on said touch surface and to generate a signal $s_y$ indicative of said touch inputs;

a touch control unit including at least a processor, the processor being configured to
receive said signal $s_y$, and
execute computer-readable instructions to
  determine touch input data from said touch input, and
  generate a touch signal $s_x$ indicative of the touch input data; and a gesture interpretation unit according to claim 11, wherein the gesture interpretation unit is configured to receive said touch signal $s_x$.

21. The unit according to claim 11, wherein the first, second and third touch inputs are entirely on portions of the touch surface configured to detect the positions $x_{nt}$, $y_{nt}$, and the pressure data $p_{nt}$ for the first, second and third touch inputs.

\* \* \* \* \*